United States Patent
Hong et al.

(10) Patent No.: US 10,979,344 B2
(45) Date of Patent: *Apr. 13, 2021

(54) METHOD AND APPARATUS FOR SETTING DETOUR PATH IN WIDEBAND HIGH FREQUENCY WIRELESS SYSTEM USING CENTRALIZED MAC PROTOCOL

(71) Applicant: Electronics and Telecommunications Research Institute, Daejeon (KR)

(72) Inventors: Seung Eun Hong, Daejeon (KR); Kyeongpyo Kim, Daejeon (KR); Yong Sun Kim, Suwon-si (KR); Hyoung Jin Kwon, Cheongju-si (KR); Woo Yong Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 5 days.

This patent is subject to a terminal disclaimer.

(21) Appl. No.: 16/529,042

(22) Filed: Aug. 1, 2019

(65) Prior Publication Data
US 2019/0356579 A1 Nov. 21, 2019

Related U.S. Application Data

(63) Continuation of application No. 15/863,471, filed on Jan. 5, 2018, now Pat. No. 10,382,318, which is a
(Continued)

(30) Foreign Application Priority Data

Jul. 14, 2008 (KR) .................. 10-2008-0068346
Sep. 10, 2008 (KR) .................. 10-2008-0089079
Feb. 2, 2009 (KR) .................. 10-2009-0007949

(51) Int. Cl.
*H04L 12/707* (2013.01)
*H04W 40/24* (2009.01)
(Continued)

(52) U.S. Cl.
CPC .......... *H04L 45/22* (2013.01); *H04L 41/5038* (2013.01); *H04L 41/5054* (2013.01);
(Continued)

(58) Field of Classification Search
CPC ......... H04L 45/28; H04L 45/22; H04L 45/00; H04L 45/02
See application file for complete search history.

(56) References Cited

U.S. PATENT DOCUMENTS

| 7,230,915 B2 | 6/2007 | Kobayashi |
| 2002/0065058 A1 | 5/2002 | Gatherer et al. |

(Continued)

FOREIGN PATENT DOCUMENTS

| JP | 2008-148032 A | 6/2008 |
| KR | 10-2005-0008468 A | 1/2005 |

(Continued)

OTHER PUBLICATIONS

Korean Office Action dated Mar. 30, 2011, in counterpart Korean Application No. 10-2009-0007949 (4 pages, in Korean, no English translation).

*Primary Examiner* — Romani Ohri
(74) *Attorney, Agent, or Firm* — NSIP Law

(57) ABSTRACT

Provided is a method and apparatus for setting a detour path in a wideband high frequency wireless system using a centralized Media Access Control (MAC) protocol. Here, in a wireless system using the centralized MAC protocol where a time synchronization and a band allocation may be performed by a single central control unit, when a signal blockage occurs while a data communication is being performed via a direct path between a source device and a destination device, the detour path may be quickly provided.

5 Claims, 7 Drawing Sheets

Related U.S. Application Data continuation of application No. 14/623,252, filed on Feb. 16, 2015, now Pat. No. 9,900,243, which is a continuation of application No. 12/502,438, filed on Jul. 14, 2009, now Pat. No. 8,958,288.

(51) Int. Cl.
  *H04L 12/24* (2006.01)
  *H04L 12/703* (2013.01)
  *H04W 24/04* (2009.01)

(52) U.S. Cl.
  CPC .......... *H04L 41/5077* (2013.01); *H04L 45/28* (2013.01); *H04W 24/04* (2013.01); *H04W 40/244* (2013.01)

(56) References Cited

U.S. PATENT DOCUMENTS

| | | | |
|---|---|---|---|
| 2004/0235489 A1* | 11/2004 | Kwon | H04W 88/04 455/452.2 |
| 2005/0261007 A1 | 11/2005 | Van Valkenburg | |
| 2006/0007907 A1 | 1/2006 | Shao et al. | |
| 2006/0198337 A1 | 9/2006 | Hoang et al. | |
| 2007/0133587 A1 | 6/2007 | Hibino et al. | |
| 2008/0108369 A1* | 5/2008 | Visotsky | H04W 72/085 455/455 |
| 2008/0221988 A1* | 9/2008 | Bappu | H04W 40/22 705/14.39 |
| 2009/0046653 A1* | 2/2009 | Singh | H04W 16/28 370/330 |
| 2009/0046732 A1* | 2/2009 | Pratt, Jr. | H04L 12/66 370/406 |
| 2010/0260042 A1* | 10/2010 | Kwon | H04W 40/22 370/227 |
| 2011/0134828 A1* | 6/2011 | Osseiran | H04B 7/15521 370/315 |

FOREIGN PATENT DOCUMENTS

| | | |
|---|---|---|
| KR | 10-0608744 B1 | 8/2006 |
| KR | 10-0759312 B1 | 9/2007 |
| KR | 10-2008-0109617 A | 12/2008 |
| WO | WO 01/97447 A2 | 12/2001 |

* cited by examiner

FIG. 7

| Octets: 1 | 1 | 1 | 1 | 1 | 2 | 1 | 2 | 2 |
|---|---|---|---|---|---|---|---|---|
| Reserved/ Second Link LQI | Third Target DEVID | Second Target DEVID | First Target DEVID | Link Count | Duration | Transaction code | Length | Command type |
| 770 | 761 | 762 | 763 | 750 | 740 | 730 | 720 | 710 |

(760 brackets: 761, 762, 763)

METHOD AND APPARATUS FOR SETTING DETOUR PATH IN WIDEBAND HIGH FREQUENCY WIRELESS SYSTEM USING CENTRALIZED MAC PROTOCOL

CROSS-REFERENCE TO RELATED APPLICATIONS

This application is a continuation of application Ser. No. 15/863,471, filed on Jan. 5, 2018, which is a continuation of application Ser. No. 14/623,252, filed on Feb. 16, 2015, which is a continuation of application Ser. No. 12/502,438 filed on Jul. 14, 2009, now U.S. Pat. No. 8,958,288 B2, issued on Feb. 17, 2015, and claims the benefit of Korean Application Nos. 10-2008-0068346 filed on Jul. 14, 2008, 10-2008-0089079 filed on Sep. 10, 2008, and 10-2009-0007949 filed on Feb. 2, 2009, in the Korean Intellectual Property Office. The entire disclosures of application Ser. Nos. 12/502,438, and 14/623,252 and Korean Application Nos. 10-2008-0068346, 10-2008-0089079, and 10-2009-0007949 are incorporated herein by reference for all purposes.

BACKGROUND

1. Field

Embodiments of the present invention relate to a method and apparatus for setting a detour path in a wideband high frequency wireless system using a centralized Media Access Control (MAC) protocol.

2. Description of Related Art

In a wireless system using ultra wideband high frequency signals of 60 GHz or a THz band in order to provide a data rate of gigabits per second, a directional antenna may be used for a power efficiency. Therefore, frequency signals may have a strong straightness, or may have a strong offset by an obstacle due to a frequency distribution characteristic.

Due to the above frequency characteristic, only when a Line of Sight (LOS) is secured between a transmitter and a receiver, a smooth communication may be enabled. When the LOS is not secured due to a human being or an obstacle, a communication disconnection may occur.

Although the LOS is blocked for a relatively very short period of time, a communication error resulting from a signal blockage may cause a serious problem in transmitting data and video streaming at a high speed.

An Institute of Electrical and Electronics Engineers (IEEE) 802.15.3c standardization organization provides a diversity function using a plurality of transmit antennas and a function of acquiring an optimal transmission path through beamforming. However, when a signal is blocked by the human being or the obstacle, the communication error may be unavoidable due to characteristics of a high frequency signal such as a strong straightness and a high offset by an object.

Generally, in a system using a centralized Media Access Control (MAC) protocol, a piconet coordinator may provide a plurality of devices with time synchronization information and resource allocation information using a beacon message. Through this, data may be transmitted and be received between the plurality of devices, or between each of the devices and the piconet coordinator.

A time synchronization and a resource allocation may be performed by the piconet coordinator based on a superframe. The superframe may include a beacon period, a Contention Access Period (CAP), and a Channel Time Allocation Period (CTAP).

The beacon period denotes a period where a beacon message is transmitted by the piconet coordinator, and includes a superframe length, a length of the CAP and the CTAP, channel allocation information, and synchronization information.

In the CAP, data may be transmitted using a contention scheme according to a Carrier Sensing Multiple Access with Collision Avoidance (CSMA/CA) scheme. The CTAP includes a plurality of CTA blocks so that a combination of a source device and a destination device may transmit and receive data without a contention.

Here, the CTA block may be formed in such a manner that a particular source device requests the piconet coordinator for a resource and receives a response to the request using a beacon message.

In the CTAP, the plurality of CTA blocks may be allocated by the piconet coordinator according to a Time Division Multiple Access (TDMA) scheme. A single CTA block or the plurality of CTA blocks for a combination of the particular source device and the destination device may be periodically allocated per a single superframe or per a plurality of superframes. Also, a predetermined number of CTA blocks may be allocated over the plurality of superframes.

SUMMARY

An aspect of the present invention provides a method and apparatus that may quickly provide a detour path when a signal blockage occurs while a data communication is being performed via a direct path between a source device and a destination device in a wireless system using a centralized Media Access Control (MAC) protocol, and thereby may prevent a communication error. In the wireless system using the centralized MAC protocol, a time synchronization and a band allocation may be performed by a single central control unit.

According to an aspect of the present invention, there is provided a controlling method of an apparatus for setting a detour path in a wideband high frequency wireless system using a centralized MAC protocol, the method including receiving, by a first device, a beacon message from a piconet coordinator to verify information of the piconet coordinator; transmitting, by the first device in response to the beacon message, information of the first device to the piconet coordinator, to be registered in the piconet coordinator; transmitting, by the first device, a probe request to a second device and a relay device, wherein the relay device provides a detour path with respect to a direct communication path between the first device and the second device; and receiving, by the first device, a response to the probe request from the second device and the relay device to verify information associated with the second device and the relay device.

In this instance, the receiving of the response to the probe request from the second device and the relay device to verify information associated with the second device and the relay device may include receiving, by the first device, the response to the probe request from the second device to verify a channel status between the first device and the second device; and receiving, by the first device, the response to the probe request from the relay device to verify a channel status between the first device and the relay device.

Also, the method may further include determining, by the first device, whether the relay device is available based on information associated with the relay device.

Also, the method may further include receiving, by the first device, information of other devices from the piconet coordinator to determine whether another relay device in addition to the relay device exists.

Also, at least one of the beacon message, information of the first device, information of the second device, information of the relay device, and the response from the second device and the relay device to the probe request may include information associated with a relay capacity of the relay device.

According to another aspect of the present invention, there is provided a controlling method of a piconet coordinator for setting a detour path in a wideband high frequency wireless system using a centralized MAC protocol, the method including transmitting a beacon message to a first device; receiving, from the first device, information of the first device as a response to the beacon message; registering the first device based on information of the first device; controlling the first device to transmit a probe request to a second device and a relay device, wherein the relay device provides a detour path with respect to a direct communication path between the first device and the second device; and controlling the first device to receive a response to the probe request from the second device and the relay device to verify information associated with the second device and the relay device.

According to still another aspect of the present invention, there is provided a controlling method of an apparatus for setting a detour path in a wideband high frequency wireless system using a centralized MAC protocol, the method including generating, by a first device, a relay-beamforming command message for beamforming between the first device and a relay device, wherein the relay device provides a detour path with respect to a direct communication path between the first device and a second device; transmitting, by the first device, the relay-beamforming command message to the relay device; determining, by the first device, whether an immediate acknowledgement (IMM-ACK) to the relay-beamforming command message is received from the relay device; and performing, by the first device, beamforming between the first device and the relay device, when the IMM-ACK is received.

In this instance, the method may further include receiving, by the second device from the relay device, a relay-beamforming command message for beamforming between the second device and the relay device; transmitting, by the first device, the IMM-ACK to the relay-beamforming command message received from the relay device; and performing, by the second device, beamforming between the second device and the relay device according to the IMM-ACK.

Also, the method may further include generating, by the first device, a relay-beamforming command message for beamforming between the first device and the second device; transmitting, by the first device, the relay-beamforming command message to the second device; determining, by the first device, whether the IMM-ACK to the relay-beamforming command message is received from the second device; and performing, by the first device, beamforming between the first device and the second device when the IMM-ACK is received.

Also, the method may further include calculating, by the first device, a channel status of a detour path that is provided by beamforming between the first device and the relay device, and by beamforming between the second device and the relay device; calculating, by the first device, a channel status of a direct path that is provided by beamforming between the first device and the second device; and selecting a path based on a comparison result between the calculated channel status of the detour path and the calculated channel status of the direct path.

According to yet another aspect of the present invention, there is provided a controlling method of a relay device for setting a detour path in a wideband high frequency wireless system using a centralized MAC protocol, the method including receiving, by the relay device from a first device, a relay-beamforming command message for beamforming between the first device and the relay device, wherein the relay device provides a detour path with respect to a direct communication path between the first device and the second device; transmitting, by the relay device, an IMM-ACK to the relay-beamforming command message; and performing, by the relay device, beamforming between the first device and the relay device according to the IMM-ACK.

In this instance, the method may further include generating, by the relay device, a relay-beamforming command message for beamforming between the second device and the relay device; transmitting, by the relay device, the relay-beamforming command message to the second device; determining, by the relay device, whether an IMM-ACK to the relay-beamforming command message is received from the second device; and performing, by the relay device, beamforming between the relay device and the second device, when the IMM-ACK is received.

Effect

According to embodiments of the present invention, in a wireless system using a centralized Media Access Control (MAC) protocol where a time synchronization and a band allocation may be performed by a single central control unit, when a signal blockage occurs while a data communication is being performed via a direct path between a source device and a destination device, it is possible to quickly provide a detour path and thereby prevent a communication error.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which:

FIG. 7 is a diagram illustrating a relay-beamforming command message according to an embodiment of the present invention.

DETAILED DESCRIPTION

Figure 1:
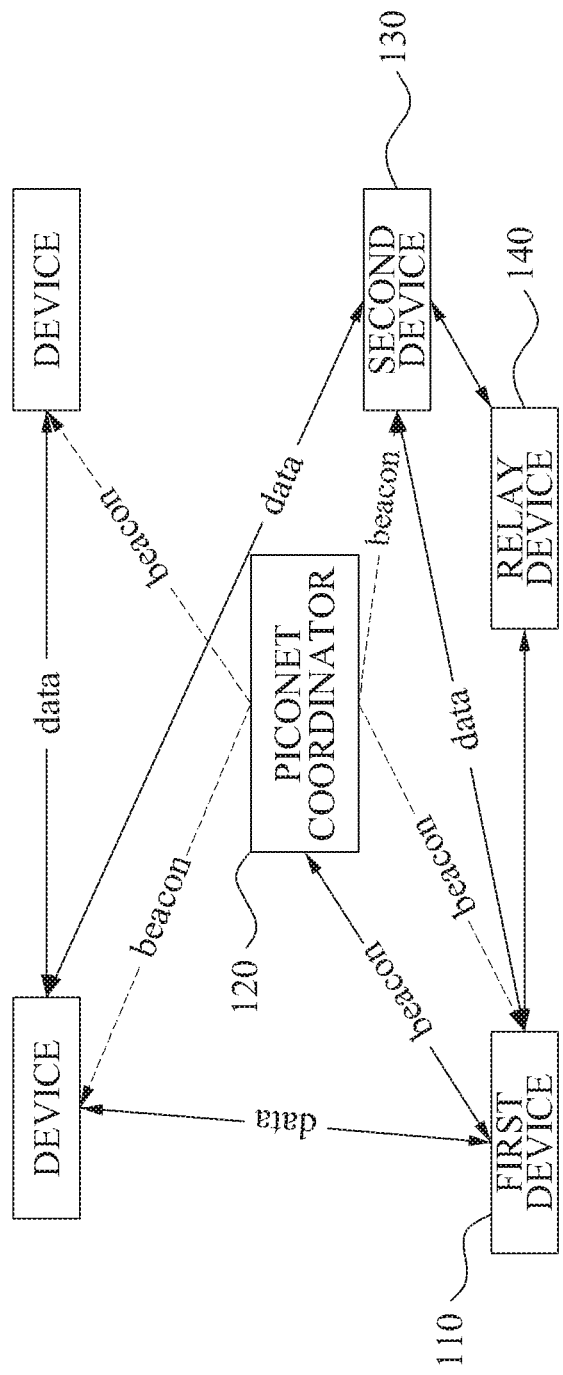
FIG. 1 is a diagram for describing a method of setting a detour path in a wideband high frequency wireless system using a centralized Media Access Control (MAC) protocol according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 is a diagram for describing a method of setting a detour path in a wideband high frequency wireless system using a centralized Media Access Control (MAC) protocol according to an embodiment of the present invention.

A piconet includes a plurality of devices, including a first device 110 and a second device 130, a piconet coordinator 120, and a relay device 140.

The piconet coordinator 120 may transmit a beacon message to the first device 110.

In this instance, the piconet coordinator 120 may provide the plurality of devices with time synchronization information and resource allocation information using the beacon message. Through this, data may be transmitted and received between the plurality of devices, or between each of the devices and the coordinator 120.

When the first device 110 desires to set the detour path in the piconet, the first device 110 may receive the beacon message from the piconet coordinator 120 to verify information of the piconet coordinator 120.

In response to the beacon message, the first device 110 may transmit information of the first device 110 to the piconet coordinator 120.

The piconet coordinator 120 may receive information of the first device 110 to register the first device 110.

The first device 110 may verify an association of all the devices in the piconet using a request for information of the piconet coordinator 120 and a response thereto.

Specifically, the first device 110 may transmit a probe request to the second device 130 and the relay device 140, and may receive a response to the probe request from the second device 130 and the relay device 140 to thereby verify information associated with the second device 130 and the relay device 140. Through the above process, the first device 110 may verify whether the second device 130 may use the detour path using the relay device 140. When a plurality of relay devices exist, the first device 110 may select any one from the plurality of relay devices.

Therefore, the first relay 110 may perform a data communication via the detour path using the relay device 140.

Here, the relay device 140 denotes a device that may provide the detour path with respect to a direct communication path between the first device 110 and the second device 130 or another device.

Also, the first device 110 may determine whether the relay device 140 is available based on information associated with the relay device 140.

When the data communication via the direct path with the second device 130 is not smoothly performed, the first device 110 may perform the data communication with the second device 130 via the detour path using the relay device 140. Also, the first device 110 may select, between the direct path and the detour path, a path that enables a relatively smooth data communication with the second device 130.

Figure 2:
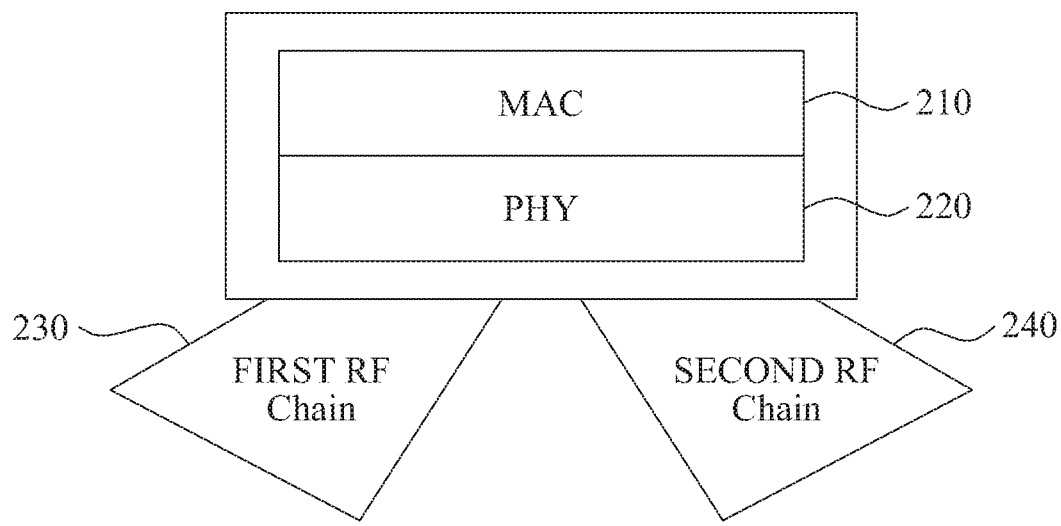
FIG. 2 is a diagram illustrating a configuration of a relay device providing a detour path according to an embodiment of the present invention.

FIG. 2 is a diagram illustrating a configuration of a relay device providing a detour path according to an embodiment of the present invention.

The relay device may generally include a MAC layer 210 and a physical (PHY) layer 220 that are defined in a system standard, for example, an Institute of Electrical and Electronics Engineers (IEEE) 802.15.3c PHY and MAC standard. The relay device may be, for example, a network device or a piconet coordinator.

The relay device may include two radio frequency (RF) chains, that is, a first RF chain 230 and a second RF chain 240. In this instance, the relay device may transmit and receive data to and from a single device or the piconet coordinator via one RF chain, for example, the first RF chain 230, and may also receive and transmit data from and to another device or the piconet coordinator via the remaining RF chain, for example, the second RF chain 240.

According to an embodiment of the present invention, the relay device may receive data from a first device corresponding to a source device via one RF chain, and transmit data to a second device corresponding to a destination device via another RF chain.

Figure 3:
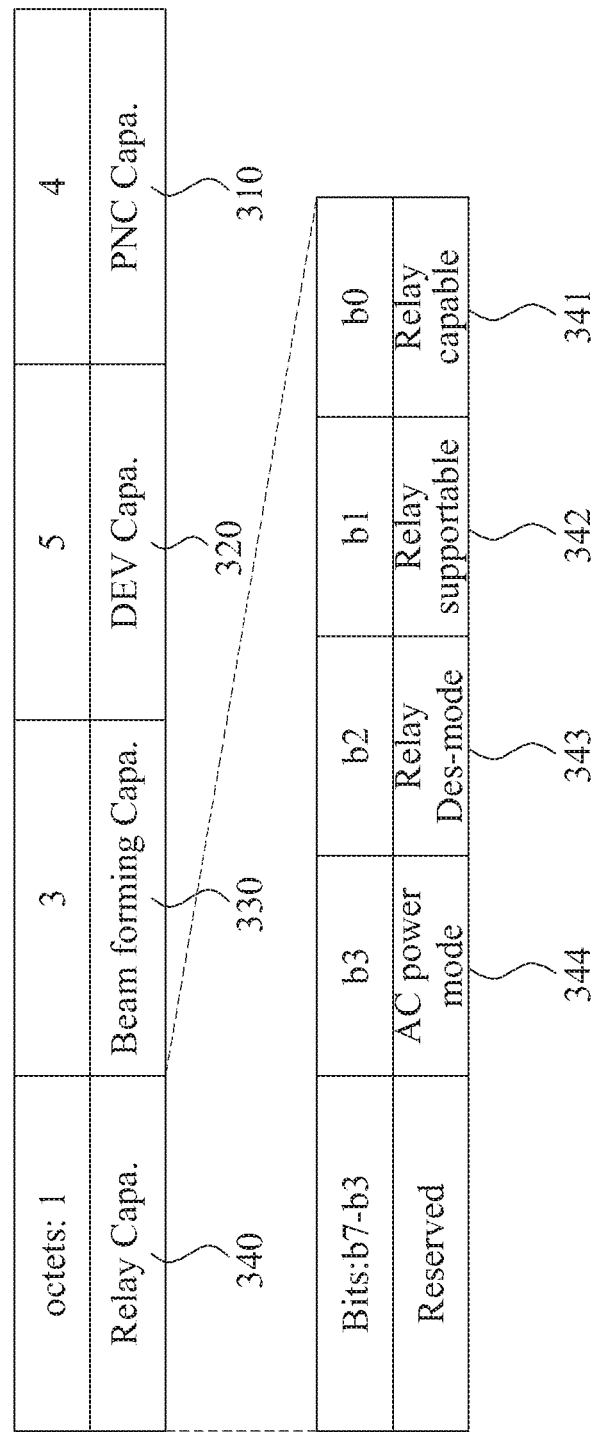
FIG. 3 illustrates an information field used when a device informs a device capacity according to an embodiment of the present invention.

FIG. 3 illustrates an information field used when a device informs a device capacity according to an embodiment of the present invention.

Referring to FIG. 3, the information field may include a piconet coordinator capacity field (PNC Capa.) 310, a device capacity field (DEV Capa.) 320, a beamforming capacity field (Beamforming Capa.) 330, and a relay capacity field (Relay Capa.) 340.

In this instance, the relay capacity field 340 may include a relay capable bit field (Relay capable) 341 indicating whether a particular device may become a relay device in a piconet, a relay supportable bit field (Relay supportable) 342 indicating whether the particular device may use a detour path using the relay device, a relay deserved mode bit field (Relay Des-mode) 343 indicating whether the relay device may priorly perform a function as the relay device, and an AC power mode bit field (AC power mode) 344 indicating whether the relay device operates on an A/C power supply.

The above information field may be used as a capacity field of the piconet coordinator when the piconet coordinator broadcasts a beacon message, and may also be used when the device reports the piconet coordinator for an association in the piconet coordinator. Also, the information field may be used when the device requests the piconet coordinator for piconet information, and responds thereto.

For example, when the first device corresponding to the source device desires to use the detour path using the relay device, the first device may verify information of the piconet coordinator capacity field (PNC Capa.) 310 included in the beacon message to determine whether the current piconet coordinator functions as the relay device.

Also, the first device may verify the relay capacity bit field (Relay capable) 341 to determine whether the second device corresponding to the destination device supports a relay function.

Also, the first device may request the piconet coordinator for piconet information and, in response thereto, receive the information field to verify capacity information of all the devices in the piconet. Through this, the first device may determine whether the relay device exists.

Also, the first device corresponding to the source device may verify whether the relay device is supported by exchanging device capacity information, and may obtain channel status information, while directly transmitting a probe request command message to the second device corresponding to the destination device and the relay device, and receiving a probe response command message from the second device and the relay device.

In this instance, when a plurality of devices, among all the devices registered in the piconet, operate as the relay device, the first device corresponding to the source device may need to select a single relay device from the plurality of devices operating as the relay device.

For this, an item may be set to determine a priority order of the relay device.

The priority order may be arbitrarily set by a system operator, or may also follow a setting as shown in the following Table 1:

TABLE 1

| Priority order | Item | Note |
| --- | --- | --- |
| 1 | PNC and operable as relay device | PNC Des-mod = 1 and Relay Des-mode = 1 is preferred |
| 2 | Relay Des-mode = 1 | Relay Des-mode = 1 is preferred |
| 3 | AC Power mode = 1 | AC Power mode = 1 is preferred |
| 4 | Channel Status (SNR, RSSI, etc.) | Higher value is preferred |
| 5 | DEV address | Higher value is preferred |

Figure 4:
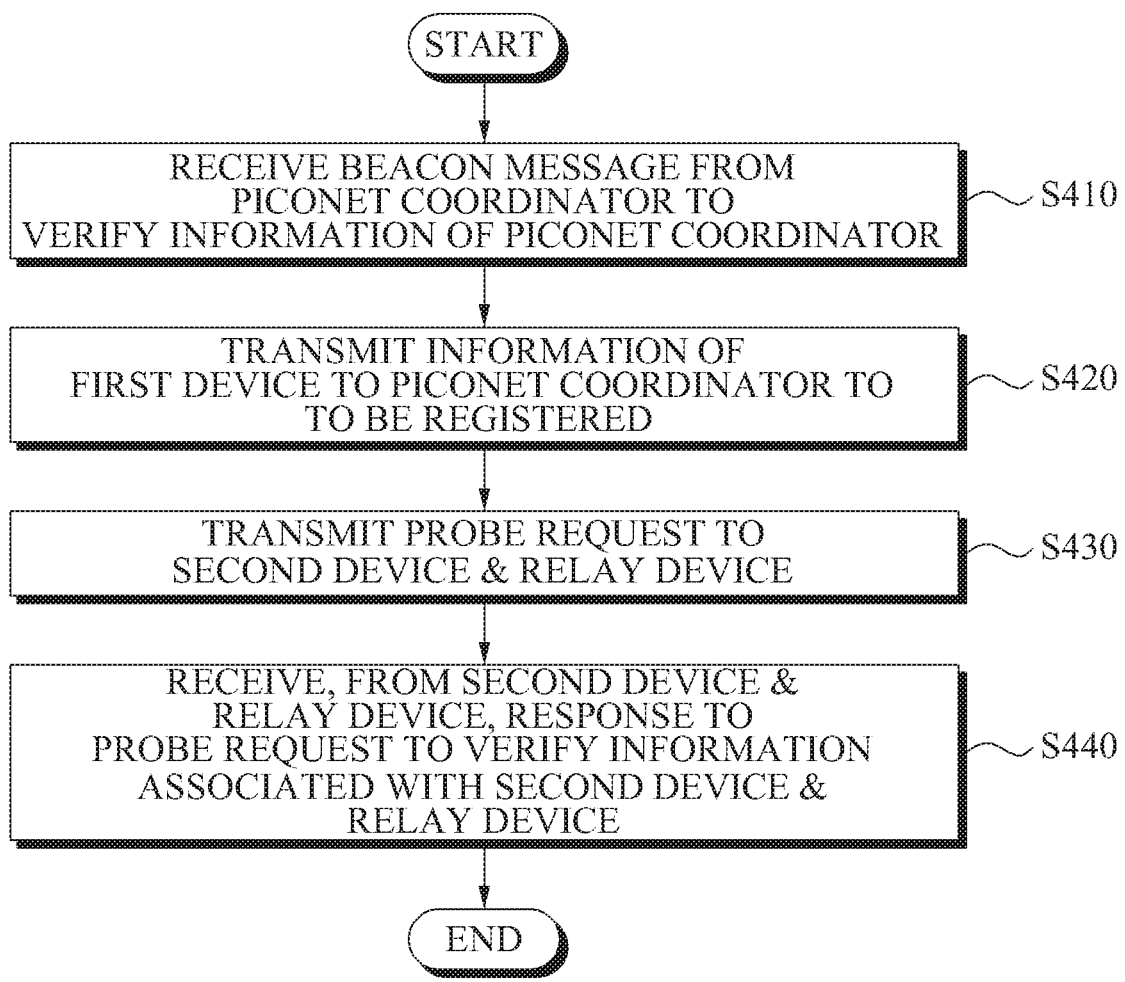
FIG. 4 is a flowchart illustrating a method of verifying, by a device in a piconet, a capacity of a relay device and another device according to an embodiment of the present invention.

FIG. 4 is a flowchart illustrating a method of verifying, by a device in a piconet, a capacity of a relay device and another device according to an embodiment of the present invention.

In operation S410, a first device may receive a beacon message from the piconet coordinator to verify information of the piconet coordinator.

In this instance, the first device may receive, from a second device, a response to a probe request to verify a channel status between the first device and the second device. Also, the first device may receive, from the relay device, the response to the probe request to verify the channel status between the first device and the relay device.

In operation S420, in response to the beacon message, the first device may transmit information of the first device to the piconet coordinator, and thereby be registered in the piconet coordinator.

In operation S430, the first device may transmit a probe request to the second device and the relay device.

In this instance, the relay device may provide a detour path with respect to a direct communication path between the first device and the second device.

In operation S440, the first device may receive, from the second device and the relay device, a response to the probe request to verify information associated with the second device and the relay device.

Next, the first device may determine whether the relay device is available based on information associated with the relay device. Also, the first device may receive information associated with other devices from the piconet coordinator to determine whether another relay device exists in addition to the relay device.

Here, information associated with a relay capacity of the relay device may be included in the beacon message, information of the first device, information of the second device, information of the relay device, the response from the second device and the relay device to the probe request, and the like.

Figure 5:
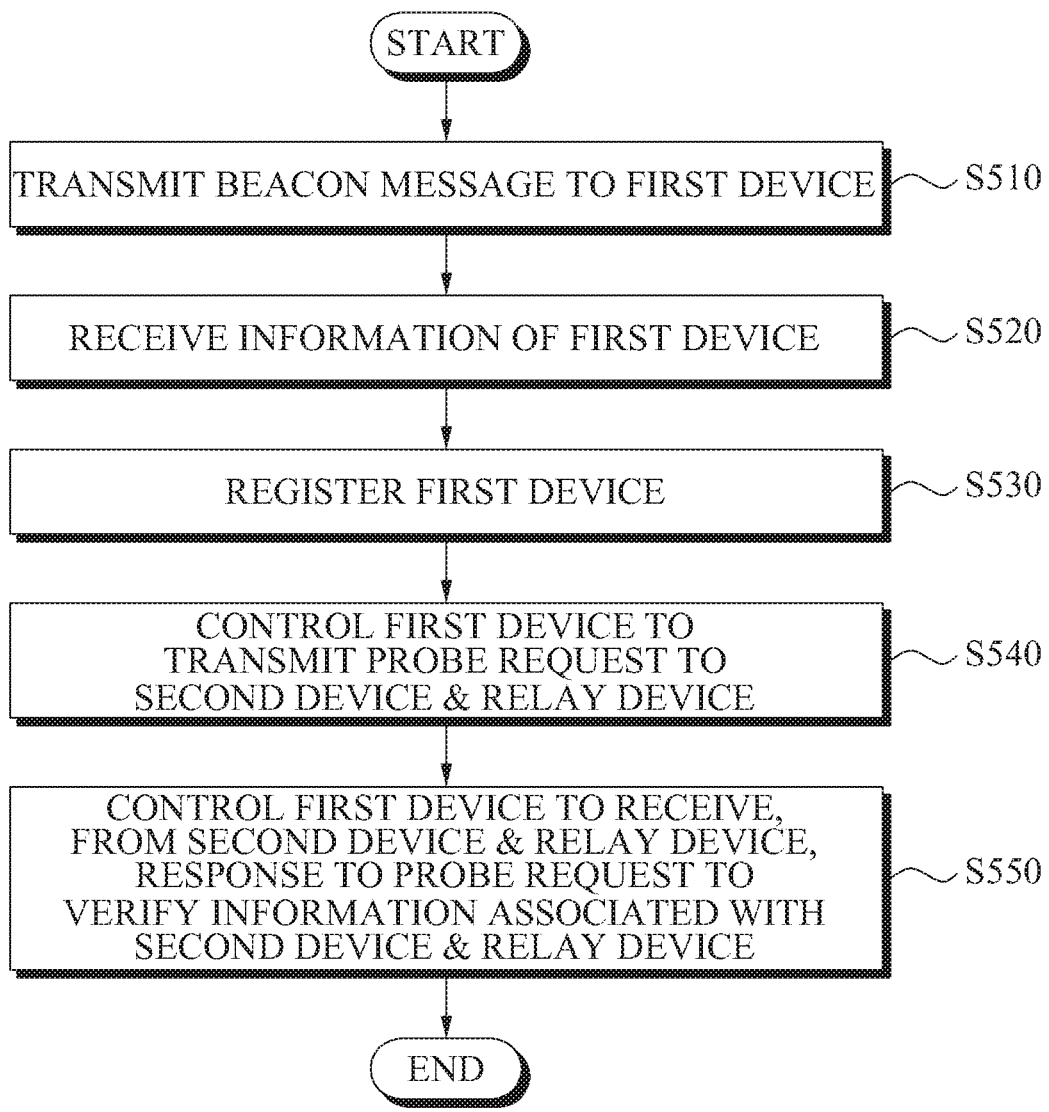
FIG. 5 is a flowchart illustrating a method of controlling, by a piconet coordinator, a device side to verify a capacity of a relay device and another device according to an embodiment of the present invention.

FIG. 5 is a flowchart illustrating a method of controlling, by a piconet coordinator, a device side to verify a capacity of a relay device and another device according to an embodiment of the present invention.

In operation S510, the piconet coordinator may transmit a beacon message to a first device. In operation S520, the piconet coordinator may receive, from the first device, information of the first device as a response to the beacon message.

In operation S530, the piconet coordinator may register the first device based on information of the first device.

In operation S540, the piconet coordinator may control the first device to transmit a probe request to a second device and the relay device. Here, the relay device may provide a detour path with respect to a direct communication path between the first device and the second device.

In operation S550, the piconet coordinator may control the first device to receive, from the second device and the relay device, a response to the probe request and thereby verify information associated with the second device and the relay device.

As described above, according to an embodiment of the present invention, devices in a piconet may verify information of a destination device and a relay device in order to adopt a detour path using the relay device.

Figure 6:
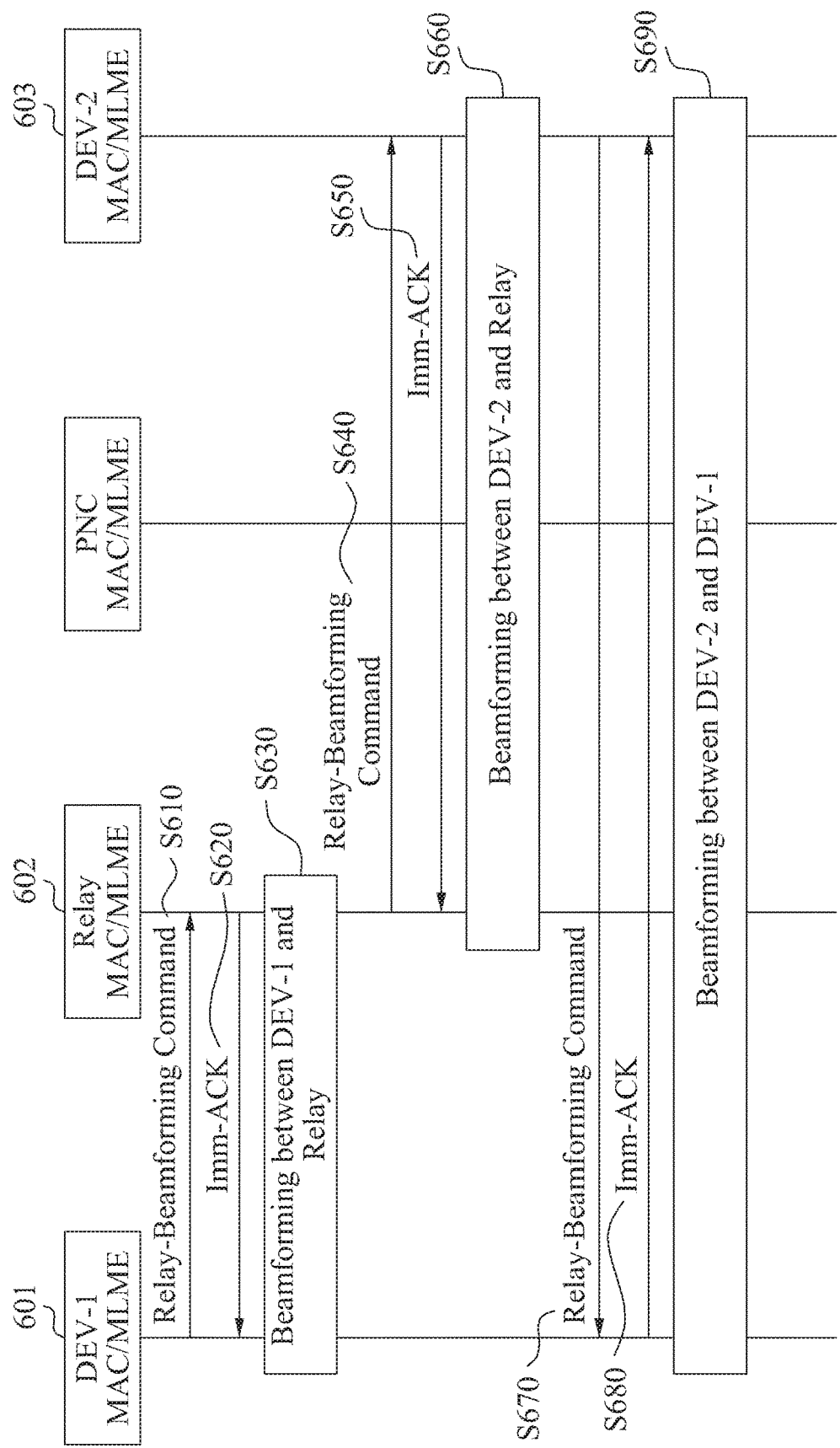
FIG. 6 is a flowchart illustrating a beamforming method between devices for a direct path and a detour path according to an embodiment of the present invention.

FIG. 6 is a flowchart illustrating a beamforming method between devices for a direct path and a detour path according to an embodiment of the present invention, and FIG. 7 is a diagram illustrating a relay-beamforming command message according to an embodiment of the present invention.

Referring to FIG. 6, it is assumed that a source device is a first device (DEV-1) 601 and a destination device is a second device (DEV-2) 603. Here, a beamforming process among the first device 601, a relay device 602, and the second device 603 may follow an IEEE 802.15.3c standard.

After the first device 601 corresponding to the source device performs a beamforming process with the relay device 602, the relay device 602 may perform a beamforming process with the second device 603 corresponding to the destination device. It corresponds to a detour path between the first device 601 and the second device 603 via the relay device 602. Next, the second device 603 may perform a beamforming process with the first device 601. It corresponds to a direct path between the first device 601 and the second device 603.

Accordingly, the first device 601 corresponding to the source device may select, between the direct path and the detour path, a path that enables a relatively smooth data communication with the second device 603.

Here, the beamforming process for a relay operation among the first device 601, the relay device 602, and the second device 603 may be performed by a relay-beamforming command message as shown in FIG. 7. By applying, with respect to the relay-beamforming command message, immediate acknowledgement (Imm-ACK) according to the IEEE 802.15.3c standard, it is possible to verify whether the relay-beamforming command message is transferred.

The relay device 602 may receive the relay-beamforming command message, as shown in FIG. 7 to be aware that the beamforming process for the relay operation is started.

The relay-beamforming command message may be constructed according to the IEEE 802.15.3c standard. As shown in FIG. 7, the relay-beamforming command message may include a command type field 710 indicating the relay-beamforming command message, a length field 720 indicating a message length, a transaction code field 730 indicating a unique beamforming process among a source device, a destination device, and a relay device for a relay operation, a duration field 740 indicating a maximum time value required for a beamforming process at a particular link, a link count field 750 indicating a particular link among three links constructed for the relay operation, and an address field 760 sequentially describing a destination device address of a link corresponding to a value of the link count field 750.

Also, a second link Link Quality Information (LQI) field 770 may be additionally provided to inform the first device 601 about an LQI of a link between the relay device 602 and the second device 603. When the value of the link count field 750 is "3", the second link LQI field 770 may include an LQI value in a relay-beamforming command message to be transmitted to the first device 601. Conversely, when the value of the link count field 750 is not "3", the second link LQI field 770 may be coded to "0" and thereby be considered to be reserved.

The relay device 602 may be pre-aware that the relay device 602 itself is a relay device. Also, the relay device 602 may be pre-aware that the relay device 602 performs the beamforming process for the relay operation a total of twice by performing the beamforming process with the first device 601 once, and by performing the beamforming process with the second device 603 once.

According to a predetermined standard, the relay device 602 may select one of two RF chains to thereby perform beamforming with the first device 601 via the selected RF chain, and to perform beamforming with the second device 603 via another RF chain.

Here, the standard may include a scheme of arbitrarily selecting one RF chain, and a scheme of simultaneously receiving a beamforming command using each of two RF chains, and predicting channel statuses of two RF chains using the received two commands to thereby select an RF chain with a relatively excellent channel status with respect to the source device.

Hereinafter, the beamforming process will be further described in detail with reference to FIGS. 6 and 7.

The first device 601 corresponding to the source device may select a value of the transaction code field 730 of an arbitrary relay-beamforming command message. The first device 601 may determine a predicted time value for the beamforming process with the relay device 602 as a value of the duration field 740, and set a value of the link count field 750 to "1". Also, the source device 601 may construct the relay-beamforming command message by sequentially including, in the address field 760, an address value of destination devices of a link where beamforming is performed according to the beamforming process. Here, the address value of destination devices of the link where the beamforming is performed may include an address value of the source device (Third Target DEVID) 761, an address value of the destination device (Second Target DEVID) 762, and an address value of the relay device (First Target DEVID) 763.

In operation S610, the relay-beamforming command message constructed as above may be transferred to the relay device 602 that is a target device of a first link.

In operation S620, when the relay device 602 receives the relay-beamforming command message, the relay device 602 may transmit Imm-ACK to the first device 601.

In operation S630, the first device 601 receiving the Imm-ACK may perform the beamforming process with the relay device 602 according to the IEEE 802.15.3c standard.

When the beamforming process between the first device 601 and the relay device 602 is completed, the relay device 602 may increase a value "1" of the link count field 750 by "1" to thereby set the link count value to "2" in the relay-beamforming command message received from the first device 601, and may transmit the corrected relay-beamforming command message to the second device 603 that is a target device of a link corresponding to the set link count value "2" in operation S640.

In operation S650, the second device 603 receiving the relay-beamforming command message from the relay device 602 may transmit Imm-ACK to the relay device 602 in operation S650.

In operation S660, the relay device 602 may perform the beamforming process with the second device 603.

When the beamforming process between the relay device 602 and the second device 603 is completed, the second device 603 may increase the link count value "2" by "1" to thereby set the link count value to "3" in the relay-beamforming command message received from the relay device 602, and may transmit the corrected relay-beamforming command message to the first device 601 that is a target device of a link corresponding to the set link count value "3" in operation S670.

In operation S680, the first device 601 receiving the relay-beamforming command message from the second device 603 may transmit Imm-ACK to the relay device 603 in operation S680.

In operation S690, the second device 603 may perform the beamforming process with the first device 601.

When the beamforming process between the first device 601 and the second device 603 is completed, the first device 601 may verify that all of the beamforming processes for the relay operation started by the first device 601 have been completed.

In the above process, when the beamforming process in an individual link exceeds a predetermined time, that is, a value of the duration field 740, target devices may not transfer the relay-beamforming command message to a subsequent target device. For example, when the first device 601 corresponding to the source device does not receive, from the second device 603, the relay-beamforming command message where the value of the link count field 750 is "3" by a time corresponding to twice the value of the duration field 740, it may be determined the beamforming process for the relay operation is a failure.

Next, after the beamforming process between the first device 601 and the second device 603 is completed, the first device 601 may determine which path to use to perform a data communication between the detour path using the relay device 602 and the direct path between the first device 601 and the second device 603.

For this, the first device 601 may calculate channel status information of the detour path including two links. As a result of the beamforming process, the first device 601 may be aware of an LQI associated with channel status information between the first device 601 and the relay device 602. The LQI between the relay device 602 and the second device 603 may be obtained from the second link LQI field 770.

Various types of algorithms may be used to determine the channel status using two LQIs.

The first device 601 may compare an LQI of the detour path with an LQI of the direct path to thereby transmit data via a path with a relatively excellent channel status.

Also, in a case where the beamforming process of the direct path fails whereby a channel status of the direct path may not be obtained, when the beamforming process of the two links using the relay device 602 succeeds, data may be transmitted via the relay path. Accordingly, when a LOS path is not formed due to a long distance between communication devices or a poor channel status, whereby a communication is unavailable via the direct path, it is possible to extend a system coverage by transmitting data via the detour path using the relay device.

When the beamforming process for the operation of the relay device 602 is successfully completed, a resource request process and a resource allocation process may be performed for the data communication. Here, the resource request process and the resource allocation process may follow the IEEE 802.15.3c standard. The resource request process denotes a process where a source device requests a piconet coordinator for a resource for a communication with a destination device. The resource allocation process denotes a process where the piconet coordinator informs the source device and the destination device about resource allocation information using a beacon message.

According to an embodiment of the present invention, while performing a beamforming process as described above, a source device, a destination device, and a relay device may share address information between devices that desire to indirectly perform a relay operation. Therefore, when resource allocation information broadcast through the beacon message is received, not only the source device and the destination device but also the relay device may be aware that resources allocated for the communication between the source device and the destination device may be used for the relay operation.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. An operating method of a destination device, the method comprising:
performing a first beamforming process with a relay device, and
perform a second beamforming process with a source device,
wherein the source device is configured to:
perform a third beamforming process with the relay device;
obtain a channel status of a detour path including a first path and a second path, the first path being a path between the source device and the relay device, and the second path being a path between the relay device and the destination device;
obtain a channel status of a direct path between the source device and the destination device;
compare information associated with the channel status of the detour path with the information associated with the channel status of the direct path; and
transmit data to the destination device via whichever one of the detour path and the direct path has a better channel status.

2. The method of claim 1, wherein the source device, the destination device, and the relay device belong to a same network.

3. The method of claim 1, wherein the relay device is selected by the source device based on a relay capabilities element information of at least one device.

4. The method of claim 3, wherein the relay capabilities element information comprises:
a relay supportability field indicating whether the at least one device is capable of relaying by transmitting and receiving frames between a pair of other devices, and
a relay preference field indicating whether the at least one device prefers to be either the relay device or one of the source device and the destination device.

5. The method of claim 4, wherein the relay capabilities element information further comprises a relay usability field indicating whether a corresponding device is capable of frame relaying through the detour path.

* * * * *